US009787866B1

(12) United States Patent
Wang et al.

(10) Patent No.: US 9,787,866 B1
(45) Date of Patent: Oct. 10, 2017

(54) IMAGE SCANNING METHOD AND IMAGE SCANNING DEVICE APPLYING THE SAME

(71) Applicant: Foxlink Image Technology Co., Ltd., New Taipei (TW)

(72) Inventors: Hsuan Hui Wang, New Taipei (TW); Chi Wen Chen, New Taipei (TW); Ting Chieh Lin, New Taipei (TW); Chien Jen Chen, New Taipei (TW); Chang Hsien Sung, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 15/355,164

(22) Filed: Nov. 18, 2016

(51) Int. Cl.
*H04N 1/04* (2006.01)
*H04N 1/00* (2006.01)

(52) U.S. Cl.
CPC ..... *H04N 1/00771* (2013.01); *H04N 1/00588* (2013.01); *H04N 1/00628* (2013.01); *H04N 1/00689* (2013.01); *H04N 1/00694* (2013.01); *H04N 1/00748* (2013.01); *H04N 2201/0081* (2013.01)

(58) Field of Classification Search
CPC .......... B65H 2511/51; B65H 2511/515; B65H 2511/52; B65H 2511/528; B65H 2513/512; B65H 2701/1311; B65H 2801/39; B65H 2511/11; H04N 1/193; H04N 2201/0081; H04N 1/0005; H04N 1/0062; H04N 1/00737
USPC ........ 358/498, 474, 496, 468, 505, 486, 497
See application file for complete search history.

(56) References Cited

U.S. PATENT DOCUMENTS

| 7,580,168 | B2 * | 8/2009 | Ikeno | H04N 1/4072 358/1.9 |
| 8,411,327 | B2 * | 4/2013 | Yamagishi | G03G 15/5025 358/1.9 |
| 8,605,320 | B2 * | 12/2013 | Goto | G06F 3/122 358/1.15 |
| 8,605,343 | B2 * | 12/2013 | Tokutsu | H04N 1/00567 358/474 |
| 8,699,084 | B2 * | 4/2014 | Sugimoto | H04N 1/00 358/1.9 |
| 8,854,706 | B2 * | 10/2014 | Kitazawa | B65H 5/26 358/496 |
| 2007/0109586 | A1 * | 5/2007 | Yamada | G06F 3/121 358/1.14 |
| 2010/0097649 | A1 * | 4/2010 | Akiyama | G06F 3/1205 358/1.15 |

(Continued)

*Primary Examiner* — Negussie Worku
(74) *Attorney, Agent, or Firm* — Lin & Associates Intellectual Property, Inc.

(57) ABSTRACT

An image scanning method is applied in an image scanning device which includes an input tray and a paper feeding sensor. The method detects whether there are papers on the input tray in step one. If there are papers, step two is executed. Otherwise, the method ends and an error is reported. In step two, papers are separated and fed. Whether the papers contact the paper feeding sensor is detected in step three. The method executes step four if the papers contact the paper feeding sensor, and ends the method with an error message otherwise. In step four, the method scans and detects whether an image of a fed edge of each of the papers is abnormal. If the image is abnormal, the method ends and an error is reported. Otherwise, scanning continues.

8 Claims, 6 Drawing Sheets

(56) References Cited

U.S. PATENT DOCUMENTS

| | | | | |
|---|---|---|---|---|
| 2010/0133745 | A1* | 6/2010 | Ikeuchi | B65H 1/14 271/265.04 |
| 2010/0290825 | A1* | 11/2010 | Iguchi | B65H 31/10 399/405 |
| 2014/0002837 | A1* | 1/2014 | Miyamoto | H04N 1/00596 358/1.13 |
| 2015/0175368 | A1* | 6/2015 | Hiroi | B65H 3/44 271/9.02 |
| 2015/0254025 | A1* | 9/2015 | Watanabe | G06F 3/1204 358/1.13 |
| 2017/0081138 | A1* | 3/2017 | Ohno | B65H 1/08 |

* cited by examiner

IMAGE SCANNING METHOD AND IMAGE SCANNING DEVICE APPLYING THE SAME

BACKGROUND OF THE INVENTION

Field of the Invention

The present invention generally relates to an image scanning method, and more particularly to an image scanning method and an image scanning device for effectively preventing a damage of an abnormal paper.

The Related Art

A conventional image scanning device includes a controller, an input tray, a paper separation mechanism, a paper feeding sensor, a paper feeding mechanism and a photosensitive element. In a process of scanning a stack of papers, the papers will be firstly separated by the paper separation mechanism, and then the paper feeding mechanism will feed the papers forward one by one, in the meanwhile, the controller controls the photosensitive element to proceed with scanning an image of each of the papers fed by the paper feeding mechanism. After completing scanning the image of one of the papers, the next paper is continued being scanned.

However, the papers are sometimes stapled with a staple pin or folded, when users place the papers on the input tray, users usually neglect that the papers are stapled with the staple pin or folded. As a result, in the scanning process, when the stapled papers or the folded papers are scanned, fed edges of the stapled papers or fed edges of the folded papers will be staggered, and if the paper feeding mechanism continues feeding the abnormal papers forward, the papers will cause damages.

In view of the above-mentioned problems, an innovative image scanning device and an image scanning method are desirable so that the image scanning device applying the image scanning method is capable of effectively preventing a damage of an abnormal paper.

SUMMARY OF THE INVENTION

An object of the present invention is to provide an image scanning method applied in an image scanning device. The image scanning device includes an input tray and a paper feeding sensor. Steps of the image scanning method are described hereinafter. Detect whether there are any papers on the input tray, if there are a plurality of papers on the input tray, execute step two, and if there is no paper on the input tray, end the process and prompt an error. Separate and feed the papers. Detect whether the papers contact the paper feeding sensor, if the papers contact the paper feeding sensor, and execute step four, if the papers are without contacting the paper feeding sensor, end the process and prompt the error. Scan and detect whether an image of a fed edge of each of the papers is abnormal, if the image of the fed edge of each of the papers is normal, execute step five, and if the image of the fed edge of one of the papers is abnormal, end the process and prompt the error.

Another object of the present invention is to provide an image scanning device applying an image scanning method to scan papers. The image scanning device includes an input tray for holding the papers thereon, a controller, a storage connected with the controller, a driving device controlled by the controller, a paper sensor controlled by the controller for detecting whether there are any papers on the input tray, a paper separation mechanism driven by the driving device for separating the papers, a paper feeding mechanism driven by the driving device for feeding forward the papers separated by the separation mechanism, a paper feeding sensor controlled by the controller for detecting the papers fed by the paper feeding mechanism and sending signals to the controller, and an image sensor controlled by the controller for scanning the fed papers and detecting whether an image of a fed edge of each of the papers partially scanned is abnormal and detecting an image of each of the normally fed papers completely scanned.

As described above, in the process of the image scanning method being applied in the image scanning device to scan the papers, the image sensor is controlled by the controller for scanning the fed papers and detecting whether the image of the fed edge of each of the papers is abnormal, if the image of the fed edge of each of the papers is normal, continue completely scanning the normally fed papers, and if the image of the fed edge of the one of the papers is abnormal, end the process and prompt the error, so that the paper feeding mechanism stops continuing feeding the abnormal paper forward for effectively preventing a damage of the abnormal paper.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
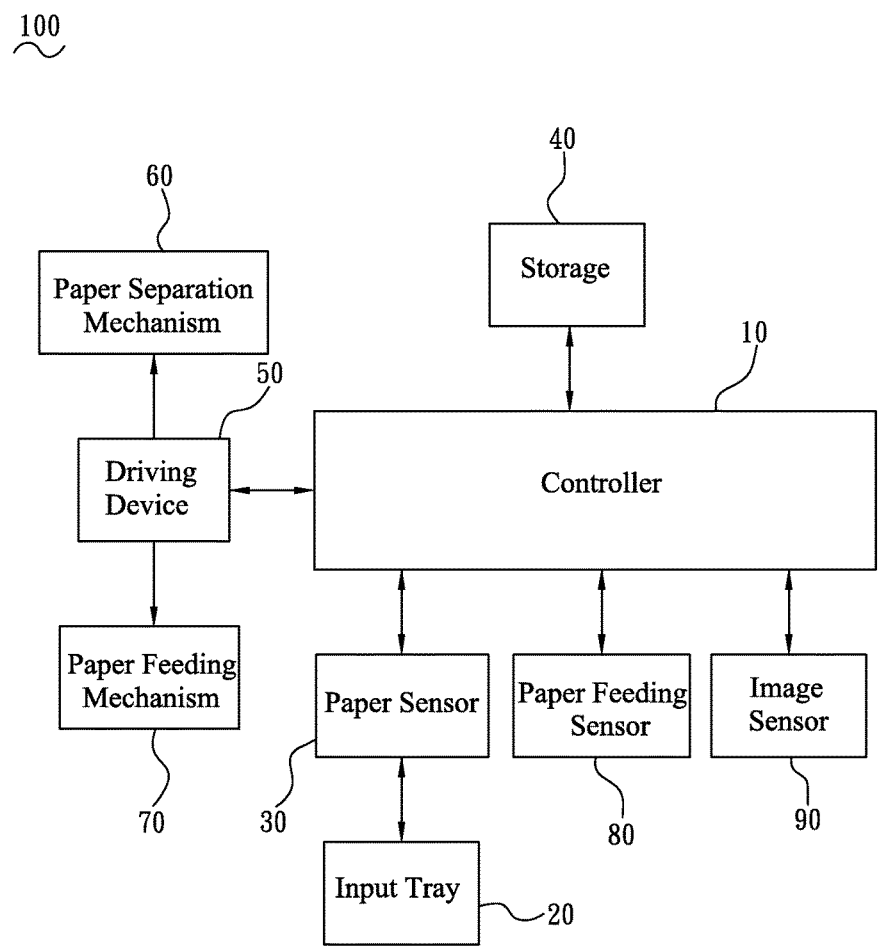
FIG. 1 is a block diagram of an image scanning device in accordance with the present invention.

With reference to FIG. 1, an image scanning device 100 in accordance with the present invention is shown. The image scanning device 100 applying an image scanning method to scan papers, includes a controller 10, an input tray 20, a paper sensor 30, a storage 40, a driving device 50, a paper separation mechanism 60, a paper feeding mechanism 70, a paper feeding sensor 80 and an image sensor 90.

The input tray 20 is used for holding the papers thereon. The paper sensor 30 is controlled by the controller for detecting whether there are any papers on the input tray 20. The storage 40 is connected with the controller 10. The driving device 50 is controlled by the controller 10. The paper separation mechanism 60 driven by the driving device 50 for separating the papers. The paper feeding mechanism 70 driven by the driving device 50 for feeding forward the papers separated by the separation mechanism 60. The paper feeding sensor 80 is controlled by the controller 10 for detecting the papers fed by the paper feeding mechanism 70 and sending signals to the controller 10. The image sensor 90 is controlled by the controller 10. The image sensor 90 is used for scanning the fed papers and detecting whether an image of a fed edge of each of the papers partially scanned is abnormal. The image sensor 90 is used for detecting an image of each of the normally fed papers completely scanned.

Figure 2:
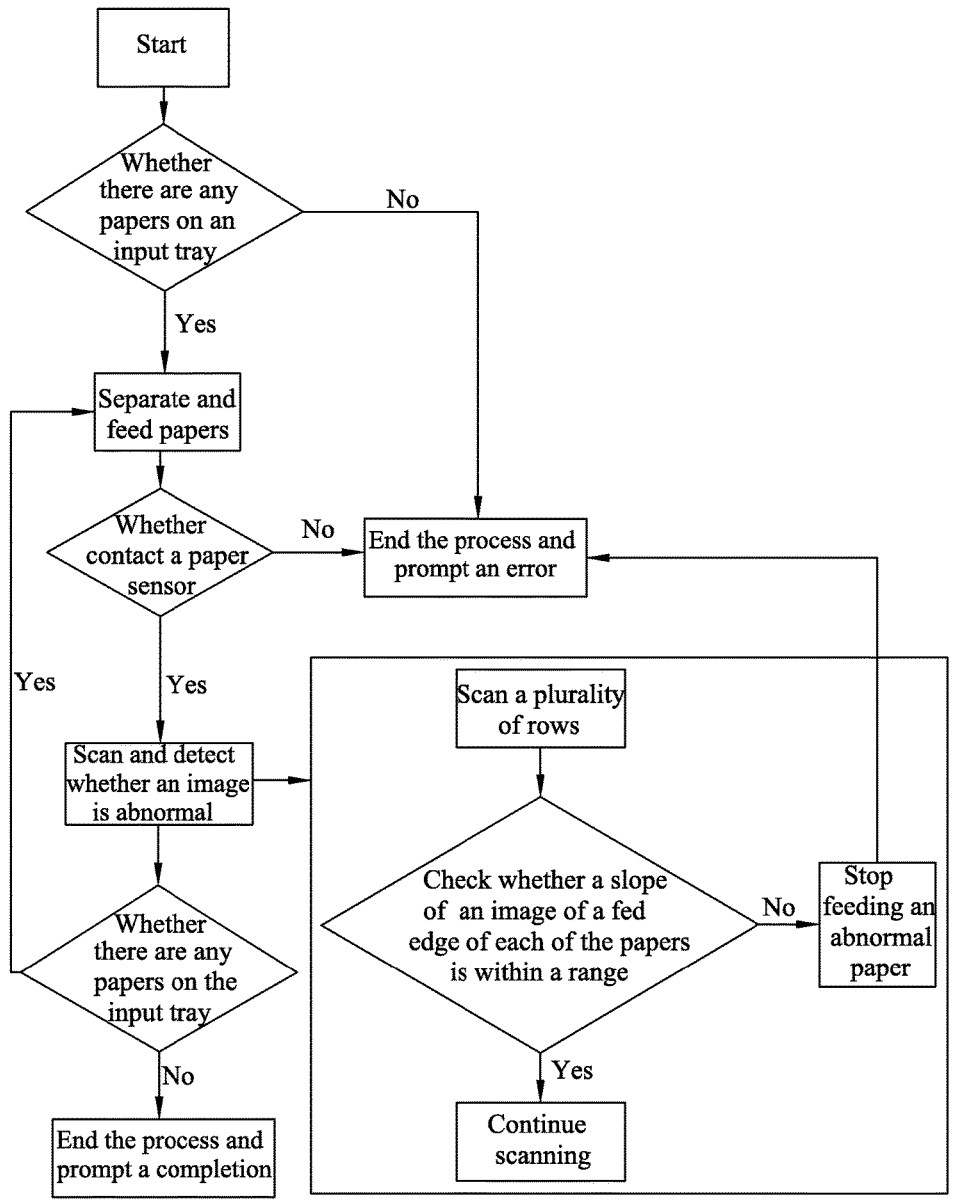
FIG. 2 is a flow chart of an image scanning method in accordance with the present invention, wherein the image scanning method is applied in the image scanning device of FIG. 1.

Referring to FIG. 1 and FIG. 2, a process of the image scanning method and specific steps of the image scanning method being applied in the image scanning device 100 to scan the papers are described as follows.

Step one: after the image scanning device 100 is started, the controller 10 controls the paper sensor 30 to detect whether there are any papers on the input tray 20. If there are a plurality of papers on the input tray 20, execute step two, if there is no paper on the input tray 20, end the process and prompt an error.

Step two: separate and feed the papers, specifically, the controller 10 controls the driving device 50 to drive the separation mechanism 60 to separate the papers on the input tray 20, the controller 10 controls the driving device 50 to drive the paper feeding mechanism 70 to feed forward the papers which are separated by the separation mechanism 60 one by one.

Step three: define a preset time, after the time is preset, detect whether the papers fed by the paper feeding mechanism 70 contact the paper feeding sensor 80, if the papers fed by the paper feeding mechanism 70 contact the paper feeding sensor 80, execute step four, if the papers fed by the paper feeding mechanism 70 are without contacting the paper feeding sensor 80, end the process and prompt the error.

Step four: the image sensor 90 scans and detects whether the image of the fed edge of each of the papers is abnormal, if the image of the fed edge of each of the papers is normal, execute step five, if the image of the fed edge of one of the papers is abnormal, end the process and prompt the error.

Step five: continue completely scanning the normally fed papers, and repeat executing the step one to step four until no paper is detected to be on the input tray 20, end the process and prompt a completion.

Referring to FIG. 1 to FIG. 6, a resolution ratio of the image scanning device 100 in accordance with the present invention is 300 DPI (Dot Per Inch). In the step four, following steps are further adopted in scanning and detecting whether the image of the fed edge of each of the papers is abnormal. Firstly, scan a preset distance in advance, the preset distance is half an inch, namely, 12.7 mm. For the image of each of the fed papers scanned in the preset distance, detect a plurality of rows along a longitudinal axis direction of the scanned image of each of the fed papers. Preferably, detect 150 rows of data along the longitudinal axis direction. The 150 rows of data are equidistant. Detect a plurality of columns along a transverse axis direction of the scanned image of each of the fed papers. Preferably, detect 9 columns of data along the transverse axis direction. The 9 columns of data are equidistant. Secondly, find coordinates of non-background points, namely coordinates of the fed edges of the papers. Thirdly, define a preset contrast value of slope, check whether a slope of the image of the fed edge of each of the papers is within a range of the preset contrast value of slope by virtue of comparing the slope of the image of the fed edge of each of the papers with the preset contrast value of slope, if the slope of the image of the fed edge of each of the papers is within the range of the preset contrast value of slope, namely the slope of the image of the fed edge of each of the papers is smaller than or equal to the preset contrast value of slope, continue scanning; if the slope of the image of the fed edge of the one of the papers is out of the range of the preset contrast value of slope, namely the slope of the image of the fed edge of the one of the papers is greater than the preset contrast value of slope, end the scanning process and prompt the error, so that the one of the papers of which the slope of the image of the fed edge is greater than the preset contrast value of the slope is defined as an abnormal paper, and the paper feeding mechanism 70 stops continuing feeding the abnormal paper forward for effectively preventing a damage of the abnormal paper. Preferably, the preset contrast value of slope of checking the image of the fed edge of each of the papers is 0.1051. If the slope of the image of the fed edge of each of the papers is smaller than or equal to 0.1051, continue scanning. If the slope of the image of the fed edge of the one of the papers is greater than 0.1051, end the scanning process and prompt the error.

In the present invention, a method for finding the coordinates of the non-background points, namely the coordinates of the fed edges of the papers further includes following steps. Firstly, confirm color values of background colors. The color values of the background colors are assumed as (Rb, Gb, Bb); and then define three preset contrast values of color distortions, the color values of the background colors subtract color values of detected points, separately. The color values of the detected points are assumed to be (Ra, Ga, Ba). If an absolute value of a difference between Rb and Ra, an absolute value of a difference between Gb and Ga, and an absolute value of a difference between Bb and Ba are separately smaller than or equal to the respective corresponding preset contrast values of the color distortions, the detected points are background points. If at least one absolute value of the difference between Rb and Ra, the difference between Gb and Ga, and the difference between Bb and Ba is greater than the corresponding preset contrast value of the color distortion, the detected points are the non-background points, namely the paper is found. Preferably, the preset contrast values of the color distortions separately corresponding to the respective absolute values of the difference between Rb and Ra, the difference between Gb and Ga, and the difference between Bb and Ba are all 20.

Figure 3:
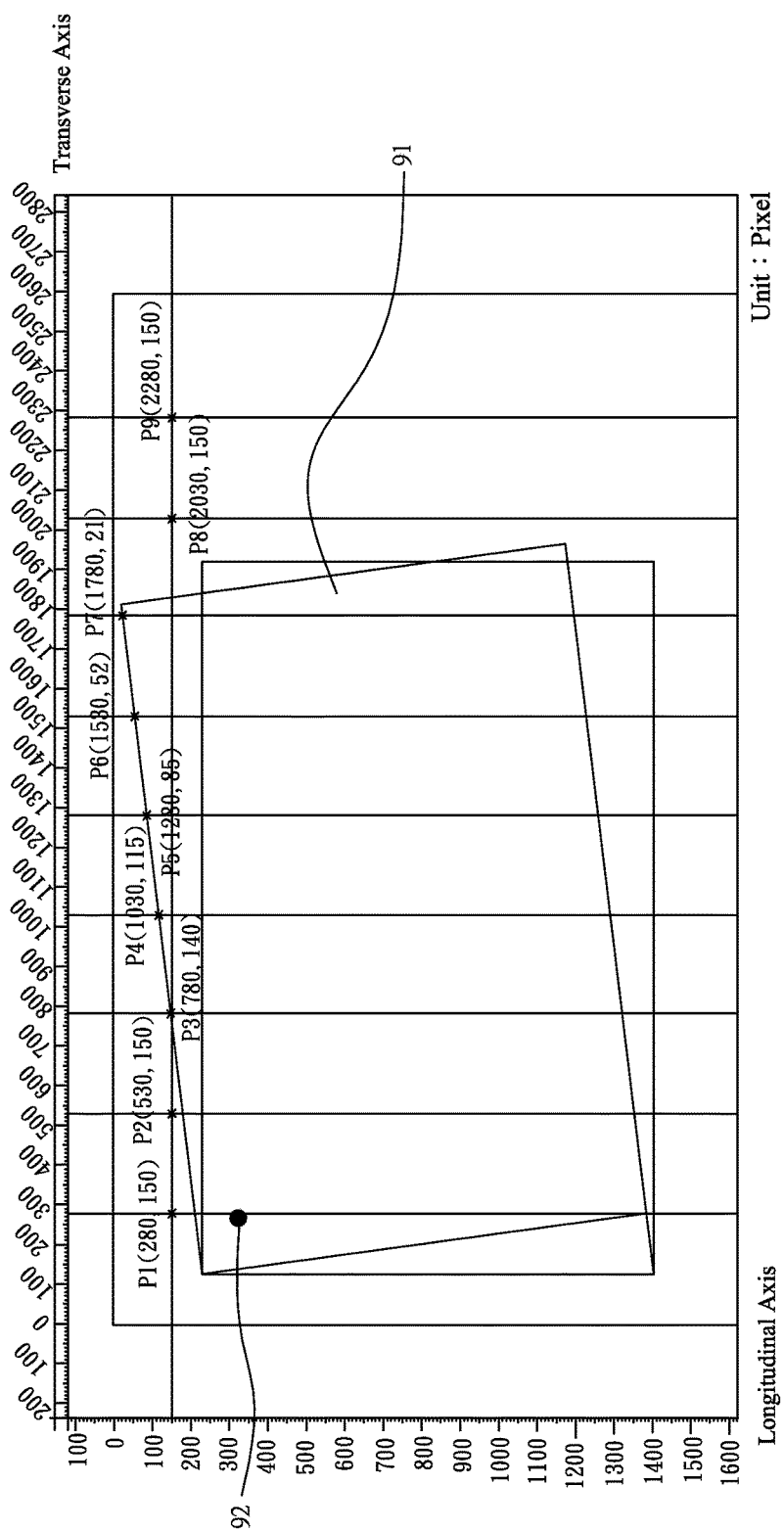
FIG. 3 is a schematic diagram of a plurality of first papers scanned by the image scanning device applying the image scanning method in accordance with a first embodiment of the present invention, wherein top left corners of the first papers are stapled with a first staple pin.

Referring to FIG. 1 to FIG. 3, top left corners of a plurality of first papers 91 in accordance with a first embodiment of the present invention are stapled with a first staple pin 92. The first papers 91 are placed on the input tray 20. When the separation mechanism 60 separates an topmost first paper 91, and the topmost first paper 91 is driven by the paper feeding mechanism 70 to be fed forward. The image sensor 90 scans half an inch of the fed first paper 91 along the longitudinal axis direction, and detects 150 rows of data for the scanned image of the fed first paper 91. Detect 9 columns of data along the transverse axis direction, when the non-background points are detected, record the non-background points, P1 to P9 are nine detected points of the 9 columns of data detected by the image sensor 90 along the transverse axis of the scanned image of the fed first paper 91, the abscissas of P1 to P9 are (280, 530, 780, 1030, 1280, 1530, 1780, 2030, 2280), units of the 9 columns of the data of the abscissas are all pixels.

An ordinate value of P1 is 150, so P1 indicates that the image sensor 90 detects 150 rows of data along the longitudinal axis direction when the abscissa is 280, no non-background points are found, namely no first paper 91 is found. Similarly, an ordinate value of P2 is 150, so P2 indicates that the image sensor 90 detects 150 rows of data along the longitudinal axis direction when the abscissa is 530, no non-background points are found, namely no paper is found. An ordinate value of P3 is 140, so P3 indicates that the image sensor 90 detects 140 rows along the longitudinal axis direction when the abscissa is 780, the non-background points are found, namely the fed first paper 91 is found. After the fed first paper 91 is found, stop finding downward. Thus the ordinate value of P3 is locked at 140, and so on, the ordinate value of P4 to the ordinate value of P9 are got.

In this first embodiment, if an inclined angle of a fed edge of the first paper 91 is to be got, a first point of the fed first paper 91, namely P7 (1780, 21), and a second point of the fed first paper 91, namely P6 (1530, 52) are detected along the longitudinal axis direction to calculate the inclined angel of the fed edge of the first paper 91. A slope of the fed edge of the first paper 91 is 0.124{31/250 or 12.7 mm*(31/150)/[(250*25.4)mm/300]}. The slope of the fed edge of the first paper 91 is greater than 0.1051. After the preset 150 rows are scanned, the paper feeding mechanism 70 is stopped for preventing the first paper 91 continuing being fed forward to cause a damage of the first paper 91.

Figure 4:
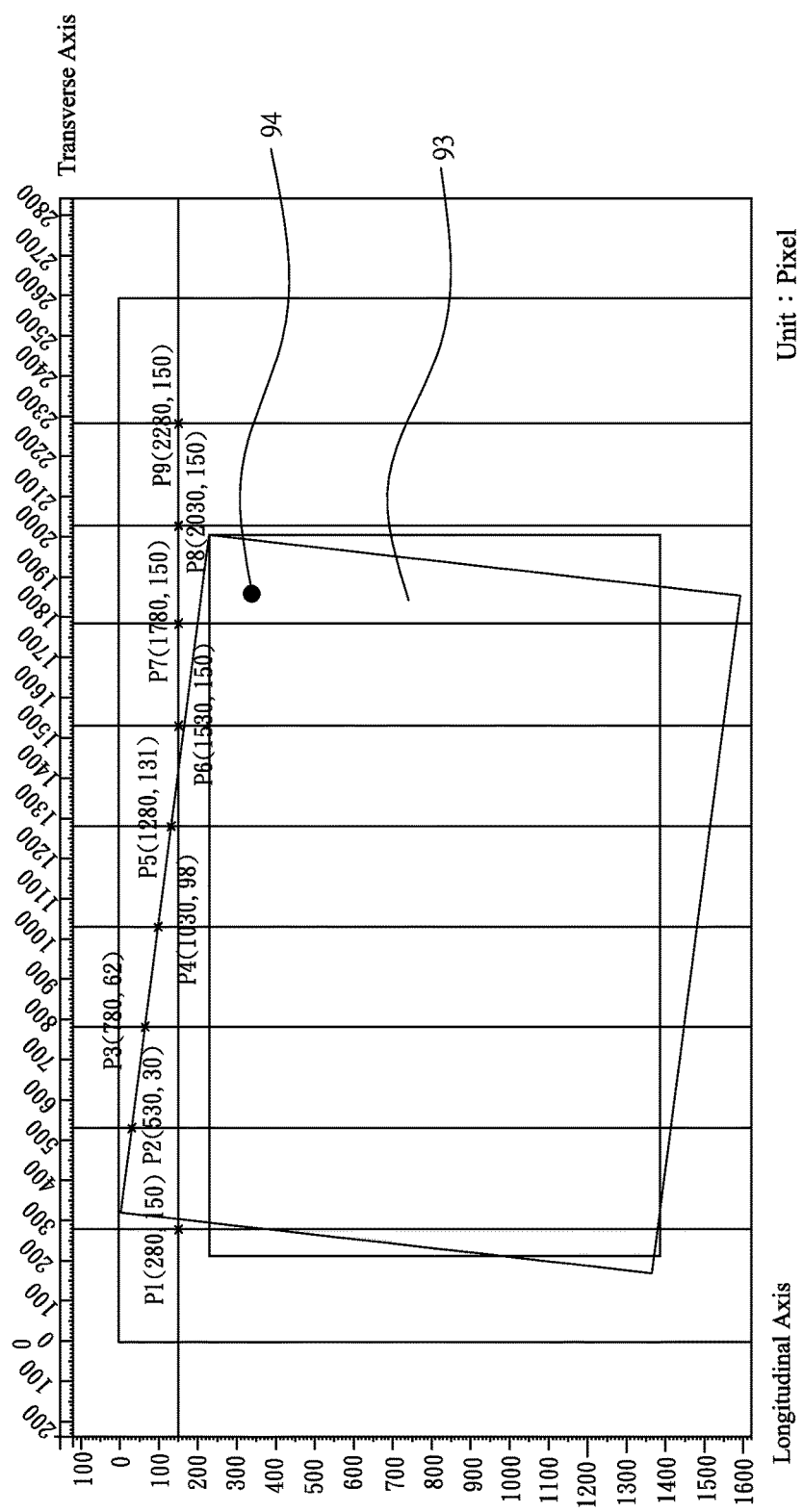
FIG. 4 is a schematic diagram of a plurality of second papers scanned by the image scanning device applying the image scanning method in accordance with a second embodiment of the present invention, wherein top right corners of the second papers are stapled with a second staple pin.

Referring to FIG. 1, FIG. 2 and FIG. 4, top right corners of a plurality of second papers 93 in accordance with a second embodiment of the present invention are stapled with a second staple pin 94. The second papers 93 are placed on the input tray 20. When the separation mechanism 60 separates the topmost second paper 93, and the topmost second paper 93 is driven by the paper feeding mechanism 70 to be fed forward. The image sensor 90 scans half an inch of the fed second paper 93 along the longitudinal axis direction, and detects 150 rows of data for the scanned image of the fed second paper 93. Detect 9 columns of data along the transverse axis direction, the image sensor 90 detects that coordinates of P1 to P9 are (280, 150), (530, 30), (780, 62), (1030, 98), (1280,131), (1530, 150), (1780, 150), (2030, 150), (2280, 150).

In this second embodiment, if an inclined angle of a fed edge of the second paper 93 is to be got, a first point of the second paper 93, namely P2 (530, 30), and a second point of the second paper 93, namely P3 (780, 62) are detected along the longitudinal axis direction to calculate the inclined angel of the fed edge of the second paper 93. A slope of the fed edge of the second paper 93 is 0.128(32/250). The slope of the fed edge of the second paper 93 is greater than 0.1051. After the preset 150 rows are scanned, the paper feeding mechanism 70 is stopped for preventing continuing feeding the second paper 93 forward to cause a damage of the second paper 93.

Figure 5:
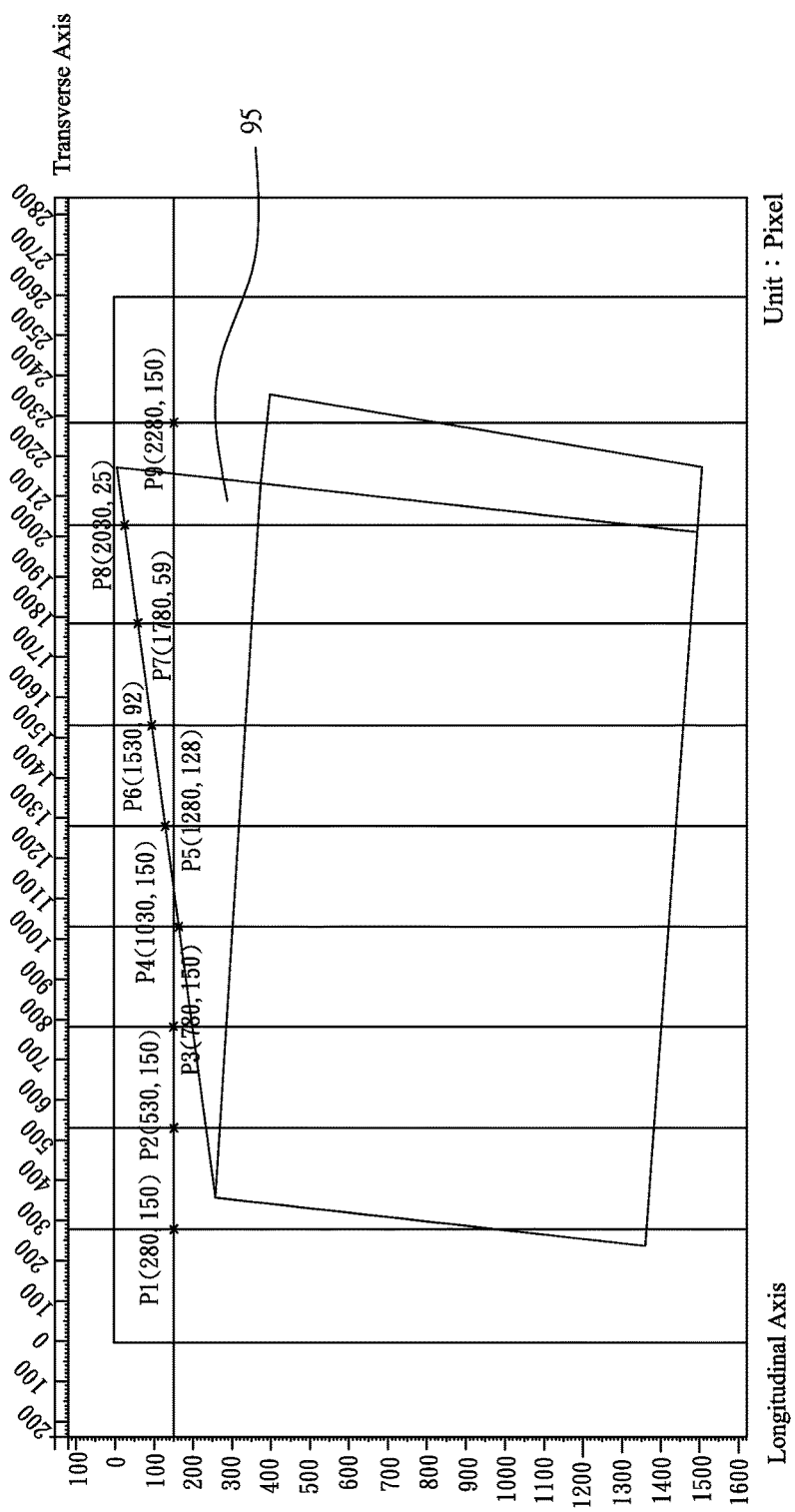
FIG. 5 is a schematic diagram of a third paper scanned by the image scanning device applying the image scanning method in accordance with a third embodiment of the present invention, wherein the third paper is folded.

Referring to FIG. 1, FIG. 2 and FIG. 5, a third paper 95 in accordance with a third embodiment of the present invention is folded. The third paper 95 is placed on the input tray 20. When the separation mechanism 60 separates a half page of the third paper 95 adjacent to the separation mechanism 60, and is driven by the paper feeding mechanism 70 to be fed forward. The image sensor 90 scans half an inch of the third paper 95 along the longitudinal axis direction, and detects 150 rows of data for the scanned image of the third paper 95. Detect 9 columns of data along the transverse axis direction, the image sensor 90 detects that the coordinates of P1 to P9 are (280, 150), (530, 150), (780, 150), (1030, 150), (1280, 128), (1530, 92), (1780, 59), (2030, 25), (2280, 150).

In this third embodiment, if an inclined angle of a fed edge of the third paper 95 is to be got, a first point of the third paper 95, namely P8 (2030, 25), and a second point of the third paper 95, namely P7 (1780, 59) are detected along the longitudinal axis direction to calculate the inclined angel of the fed edge of the third paper 95. A slope of the fed edge of the third paper 95 is 0.136(42/250). The slope of the fed edge of the third paper 95 is greater than 0.1051. After the preset 150 rows are scanned, the paper feeding mechanism 70 is stopped for preventing continuing feeding the third paper 95 forward to cause a damage of the third paper 95.

Figure 6:
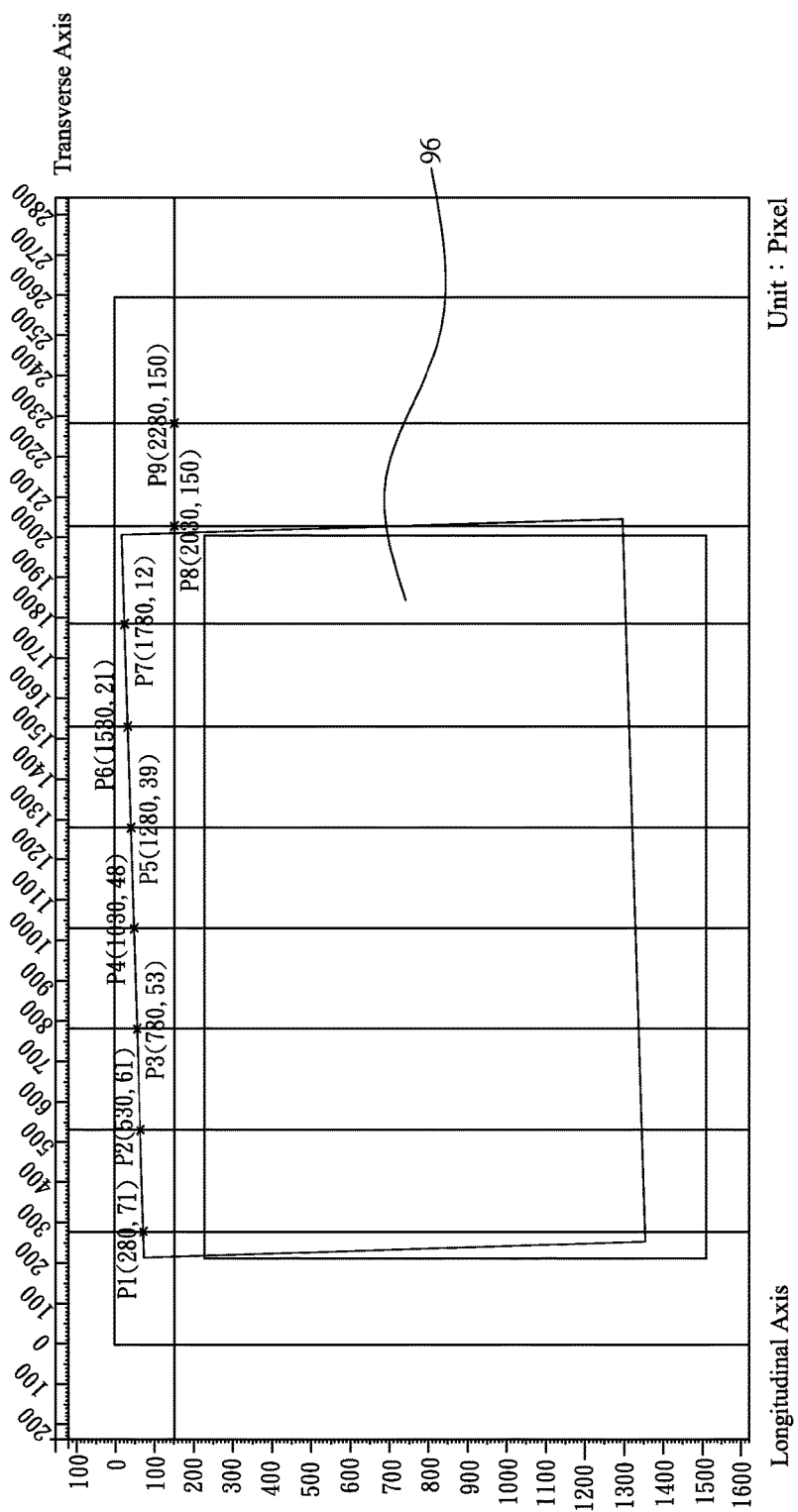
FIG. 6 is a schematic diagram of a plurality of fourth papers scanned by the image scanning device applying the image scanning method in accordance with a fourth embodiment of the present invention, wherein the fourth papers are normally fed.

Referring to FIG. 1, FIG. 2 and FIG. 6, a fourth paper 96 in accordance with a fourth embodiment of the present invention is normally fed. The fourth paper 96 is placed on the input tray 20. When the separation mechanism 60 separates the fourth paper 96 from the input tray 20, and the fourth paper 96 is driven by the paper feeding mechanism 70 to be fed forward. The image sensor 90 scans half an inch of the fourth paper 96 along the longitudinal axis direction, and detects 150 rows for the scanned image of the fourth paper 96. Detect 9 columns of data along the transverse axis direction, the image sensor 90 detects that the coordinates of P1 to P9 are (280, 71), (530, 61), (780, 53), (1030, 48), (1280, 39), (1530, 21), (1780, 12), (2030, 150), (2280, 150).

In this fourth embodiment, if an inclined angle of a fed edge of the fourth paper 96 is to be got, a first point of the fourth paper 96, namely P7 (1780, 12), and a second point of the fourth paper 96, namely P6 (1530, 21) are detected along the longitudinal axis direction to calculate the inclined angel of the fed edge of the fourth paper 96. A slope of the fed edge of the fourth paper 96 is 0.036 (9/250). The slope of the fed edge of the fourth paper 96 is smaller than 0.1051. After the preset 150 rows are scanned, the paper feeding mechanism 70 continues feeding the fourth paper 96 forward to proceed scanning the fourth paper 96.

As described above, in the process of the image scanning method being applied in the image scanning device 100 to scan the papers, the image sensor 90 is controlled by the controller 10 for scanning the fed papers and detecting whether the image of the fed edge of each of the papers is abnormal, if the image of the fed edge of each of the papers is normal, continue completely scanning the normally fed papers, if the image of the fed edge of the one of the papers is abnormal, end the process and prompt the error, so that the paper feeding mechanism 70 stops continuing feeding the abnormal paper forward for effectively preventing the damage of the abnormal paper.

What is claimed is:

1. An image scanning method applied in an image scanning device, the image scanning device including an input tray, a paper sensor, an image sensor, a paper separation mechanism, a paper feeding mechanism, a paper feeding sensor and a controller, the image scanning method being executed in the controller and comprising the steps of:
   detecting whether there are any papers on the input tray using the paper sensor, and ending the method with an error message if there is no paper on the input tray;
   separating and feeding the papers using the paper separation mechanism and the paper feeding mechanism if there is a plurality of papers on the input tray;
   detecting whether the papers contact the paper feeding sensor, and ending the method with an error message if the papers do not contact the paper feeding sensor;

scanning and detecting whether an image of a fed edge of each of the papers is abnormal if the papers contact the paper feeding sensor, and ending the method with an error message if the image of the fed edge of one of the papers is abnormal; and continuing and scanning the fed papers if the image of the fed edge of each of the papers is normal, and repeatedly executing the above steps until no paper is detected on the input tray, and ending the method with a completion message;

wherein the step of scanning and detecting whether an image of a fed edge of each of the papers is abnormal includes:

scanning the image of the fed edge for a preset distance;

detecting a plurality of rows along a longitudinal axis direction of the scanned image and a plurality of columns along a transverse axis direction of the scanned image;

finding coordinates of non-background points of the scanned image as the coordinates of the image of the fed edge;

defining a preset contrast value of slope and checking whether a slope of the image of the fed edge is within a range of the preset contrast value of slope;

ending the method with an error message if the slope of the image of the fed edge is out of the range of the preset contrast value of slope; and continuing to scan each of the papers if the slope of the image of the fed edge is within the range of the preset contrast value of slope.

2. The image scanning method as claimed in claim 1, wherein checking whether a slope of the image of the fed edge is within a range of the preset contrast value of slope is accomplished by comparing the slope of the image of the fed edge with the preset contrast value of slope, continuing scanning each of the papers if the slope of the image of the fed edge is smaller than or equal to the preset contrast value of slope, and ending the method with an error message if the slope of the image of the fed edge of one of the papers is greater than the preset contrast value of slope.

3. The image scanning method as claimed in claim 1, wherein the step of finding coordinates of non-background points of the scanned image as the coordinates of the image of the fed edge includes:

determining color values (Rb, Gb, Bb) of background and defining three corresponding preset contrast values of color distortion;

obtaining color values (Ra, Ga, Ba) of each detected point and respective differences Rb-Ra, Gb-Ga, Bb-Ba of color values between background and the detected point;

identifying the detected point as a background point if absolute values of Rb-Ra, Gb-Ga, and Bb-Ba are respectively smaller than or equal to the corresponding preset contrast values of color distortion; and identifying the detected point as a non-background point if at least one absolute value of Rb-Ra, Gb-Ga and Bb-Ba is greater than the corresponding preset contrast value.

4. The image scanning method as claimed in claim 3, wherein the corresponding preset contrast values of color distortion are all 20.

5. The image scanning method as claimed in claim 1, wherein in the step of detecting a plurality of rows along a longitudinal axis direction of the scanned image and a plurality of columns along a transverse axis direction of the scanned image, 150 rows of data along the longitudinal axis direction are detected.

6. The image scanning method as claimed in claim 5, wherein the 150 rows of data are equidistant.

7. The image scanning method as claimed in claim 1, wherein in the step of detecting a plurality of rows along a longitudinal axis direction of the scanned image and a plurality of columns along a transverse axis direction of the scanned image, 9 columns of data along the transverse axis direction are detected.

8. The image scanning method as claimed in claim 7, wherein the 9 columns of data are equidistant.

* * * * *